June 13, 1972  C. R. HIMMLER  3,669,570

POWER REGULATION FOR FLUID MACHINES

Filed March 9, 1970

Inventor:
Conrad R. Himmler

ATTORNEYS

United States Patent Office 3,669,570
Patented June 13, 1972

3,669,570
POWER REGULATION FOR FLUID MACHINES
Conrad Richard Himmler, Les Essarts le Roi, France, assignor to Mannesmann-Meer Aktiengesellschaft, Moenchengladbach, Ohlerkirchweg, Germany
Filed Mar. 9, 1970, Ser. No. 17,444
Int. Cl. F04b 1/30, 13/64
U.S. Cl. 417—222
6 Claims

ABSTRACT OF THE DISCLOSURE

A swash plate fluid pump or motor is controlled for constant power through fluid regulation control devices operating with feedback which provides for hyperbolic regulating characteristics as between fluid flow and operating pressure. The regulator includes a control piston and a regulator valve piston in a casing the relative position of which is determined through feedback from the control piston-swash plate linkage.

---

Figure 1:
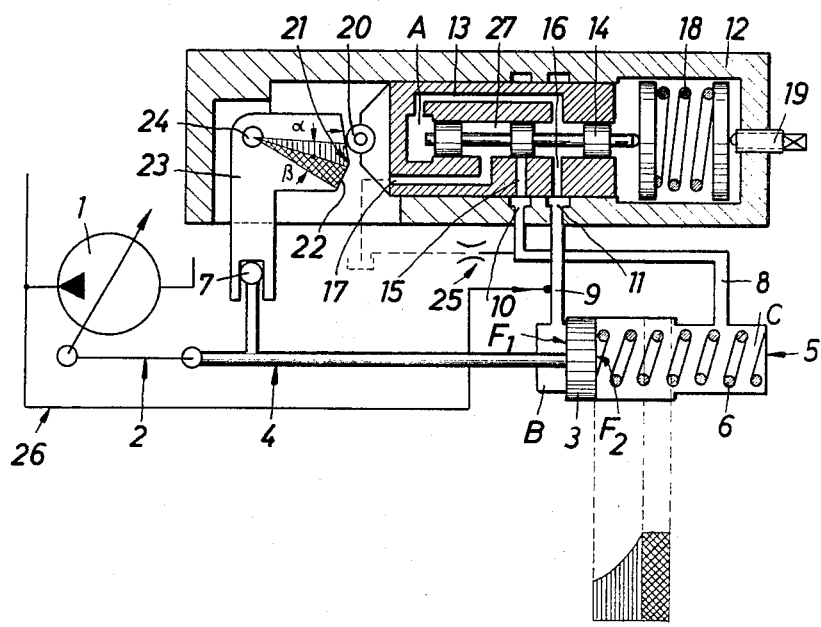

The present invention relates to a power controller and regulator for hydraulic, fluid pumps or motors of the axial piston, swash plate type, the controller and regulator to be used for maintaining the power of the hydraulic device constant within a predetermined adjustment range and for particular, constant r.p.m. The controller and regulator responds to operating pressure of the fluid pump or motor control of a piston used to adjust the tilting angle or the swash plate. Operating pressure acts particularly against a spring biased regulator piston providing valve operation for controlling the control piston, both pistons being included in the controller and regulator.

As is known, accurately operating power control of such fluid device depends upon constancy of the (mathematical) product of fluid flow quantity (output or input) and feed or operating pressure, whereby the values of this product are on a hyperbolic characteristic representing power of the system. If the regulator piston is acted upon by operating pressure as well as by spring bias, the differing characteristics of the spring assembly renders impossible tracking of the resulting products of fluid quantity and pressure on that hyperbolic characteristics. It has been attempted to reproduce a hyperbolic function in the relationship between regulator, or acting upon the fluid pump to be controlled. However, implementation of such function in the transfer characteristics of the device was found to involve very expensive construction. Alternatively, constructions required numerous linkage and articulating points of levers and are, thus, rather complicated and do not offer satisfactory control.

The problem solved by the invention is to provide a power controller and regulator for the type fluid machines outlined above which operates in accordance with a hyperbolic function so that the total efficiency of the fluid device is as high as possible. Additionally, response time for control and regulation is to be reduced and the regulator must not hunt to a significant degree. Moreover, friction is to be reduced and excessive numbers of articulating joints is to be avoided.

In accordance with one aspect of the present invention in the preferred embodiment thereof, it is suggested, to provide a housing for the regulator with suitable ducts and channels. A control casing is displaceably positioned in the housing. A regulator valve piston is concentrically disposed in the casing for displacement therein, which regulator piston is acted upon, on one side, by operating pressure of the system. From the other side the piston is spring biased. The regulator piston operates as valve to control operation of the principle control piston which adjusts the tilting angle of the swash plate of the fluid motor or pump. The tilting angle adjusting means are articulated addtionally to a turning lever having particular cam surface on which rides a feeler. That feeler is mounted on the casing to provide relative displacement between casing and piston therein. Turning lever and feeler provide feedback depending upon the displacement of the tilting adjusting means. The cam surface has a first portion representing generally the function of flow quantity times pressure being constant. That surface is continued in a second cam surface portion defined by a particular radius relative to the pivot point of the turning lever, to obtain pressure cutoff or limit, i.e., upon obtaining a particular pressure limit the pump adjusts to a particular fluid flow necessary to maintain that pressure.

In accordance with another feature of the invention, operating pressure in the casing as cooperating with the spring for the regulator piston therein, is additionally instrumental for obtaining and maintaining positive engagement between the feeler on the casing and the cam surface on the turning lever, the angular position of which being determined and maintained by connection between principle control piston and swash plate. The regulation arrangement is stabilized by a throttled bypass to a zero pressure outlet, leading from the conduit for one of the chambers of the cylinder for the principle control piston.

In order to establish particulr response time of the regulator, the regulator piston is provided with differing size throttling collars as to its valve operation for control of pressure in the one cylinder chamber.

The features of the invention outlined above characterize a power controller and regulator having small size, small movable masses, and it operates at low friction. Particularly, the overall construction layout is rather simple as the feedback connection between swash plate adjuster and regulator is provided merely by that turning lever having the particular cam surface. Turning of that lever is dependent upon the displacement path of the adjuster, and the cam surface translates that displacement and position to a particular displacement and position for the control casing in accordance with the requirement of constant power of the fluid machine. The advantages of the invention are particularly pronounced for high pressure fluid machines.

Figure 2:
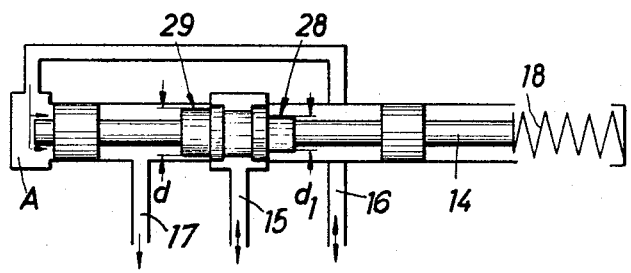

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates somewhat schematically a cross section through a power controller and regulator showing additionally operative connection to a swash plate fluid pump; and FIG. 2 shows in greater detail a regulator valve piston in the device shown in FIG. 1.

Proceeding now to the detailed description of the drawings, reference numeral 1 denotes a schematically depicted fluid pump of the swash plate type for pumping fluid into a pipe 26 at a rate determined by the tilting angle of the swash plate and at a pressure determined by the control to be described. The tilting angle of the swash plate is adjustably determined by the position of a control rod 2 linked to a piston rod 4 of a control piston 3. Piston 3 runs in a control cylinder 5 and is spring biased by means of a spring 6. The piston divides the cylinder 5 in two chambers, B and C.

A ball-joint like follower 7 is mounted on piston rod 7 in a manner known per se. Ducts 8 and 9 provide fluid conduction paths respectively from chambers C and B of cylinder 5 to ring channels 10 and 11 respectively in a housing 12 of the power controller and regulator.

A tubular casing 13, closed on one end, is axially displaceably positioned in housing 12. A regulator valve piston 14 is conductically received by control casing 13 in a bore 27 thereof. Bore 27 defines a piston or valve chamber for piston 14 and communicates with channels 15 and 16 in the wall of casing 13. These channels lead radially outwardly from bore 27, whereby additionally channel 16 leads also beyond bore 27 and is returned to a chamber A, which is an extension of bore 27, but adjacent one end of piston 14. An additional channel 17 in casing 13 runs to a zero pressure outlet, for discharge of fluid into a reservoir or the like. Piston 14, thus, operates as valve to close passage between bore 27 and channel 15, or to provide selective communication thereof to channel 16 or to channel 17.

Pressure in chamber A of control casing 13 is balanced by a biased spring 18 acting upon regulator piston 14 and bearing against a disk the position of which is adjusted by a thumb screw 19 to determine the particular position of the disk against which bears spring 18, and that, in turn, determines the valve of pressure in chamber A for which regulator piston 14 has a position to close channel 15.

A pulley like cam feeder wheel 20 is mounted on the outer, axial end face of casing 13 bearing in any instant against one of two cam surface tracks 21 and 22 of a turning lever 23. These cam surfaces are on one arm of lever 23. The other arm of lever 23 has an aperture which receives the ball-follower 7. Lever 23 turns about pivot point 24, thereby providing feedback between the swash plate adjusters 2–4–3 and the regulator and controller casing 13.

A linear extension of duct 8 (branching off the main conduit path thereof to ring channel 8) leads via a choke or throttling device 25 to a zero pressure outlet for the fluid (for example oil) to provide a particular degree of stabilization for the system. Pressure fluid (e.g. oil) for duct 9 is taken from pipe 26 as supplied by pump 1, to fill chamber B, which is a portion of cylinder 5 between one axial end wall and piston 3. Pressure in chamber B acts upon annular surface F1 of control piston 3, while the other, circular surface F2 thereof faces chamber C and is acted upon by pressure oil therein as supplied through duct 8 and channels 10 and 15. The flow into and out of chamber C is, thus, controlled by regulator piston 14. The control piston 3 is operated as differential pressure piston, responding to operating pressure in line 26 (chamber B) and regulator controlled pressure in chamber C. As duct 9 connects to line 26 and communicates, in turn, with channel 16, operating pressure in line 26 is also supplied to chamber A. This establishes the basic regulator input.

In order to maintain pumping power of pump 1 constant, for constant drive speed, any pressure increase (decrease) must be followed by a reduction (increase) in fluid flow. Therefore, the swash plate tilt angle must be position controlled by piston 3 in dependence upon pressure in accordance with the diagram, plotted in FIG. 1 in association with position values for piston 3.

FIG. 1 illustrates the various pistons in starting position for the control and regulating device, and the swash plate in pump 1 is adjusted as to maximum tilting angle by operation of the particular position of the elements 2–4–3, to obtain maximum flow of pumping fluid in pipe 26. This operational state was preceded by the following events.

A pulley like came feeler wheel 20 is mounted on the control piston 3 in cylinders to the left and, thus, aids in pressure build up in the system, whereby, however, regulator piston 14 is shifted likewise to the left by operation of spring 18 until the required operating pressure has been obtained. As piston 14 moves to the left channel 15 in control casing 13 is opened and pressurized oil from conduit 26 flows into channel 15 via duct 9, channel 11 and channel 16, to fill chamber C in cylinder 5.

Concurrently thereto, chamber B of control cylinder 5 as well as chamber A in casing 13 receive pressurized fluid whereupon piston 14 is shifted back, to the right, and to an extent as determined by the increase in pressure in line 26 as resulting from operation of the pump. Piston 14 stops when oil pressure force in chamber A and force of compressed spring 18 balance on piston 14. This balanced position of piston 14 finds channel 15 of casing 13 closed by operation of that piston 14 and the regulating system is in a state of equilibrium. This is the position illustrated in FIG. 1.

As now pump load increases suddenly, for example, due to pressure increase beyond the adjusted pressure level of the regulator system, regulator piston 14 responds first to that change as that excess pressure builds up particularly in chamber A. Thus, piston 14 is displaced from the illustrated position in casing 13, to the right. Now, channels and ducts 8, 10 and 15 are conductively connected to discharge outlet 17 so that control pressure for piston 3 in chamber C of cylinder 5 drops. Accordingly, control piston 3 is shifted to the right. The change in relative position of piston 3 is transmitted to the swash plate via rods 2 and 4, and the tilting angle of the swash plate is changed accordingly. In particular, the tilting angle is changed for obtaining a reduction in fluid flow.

During movement of piston 3 and of the swash plate, follower 7 acts upon turning lever 23, and as piston 3 moves to the right, lever 23 is turned counterclockwise. Cam surface 21 of lever 23 has hyperbolic contour over an angular range α as referred against the turning or pivot point of lever 23. Accordingly, feeler roll 20, as riding on cam surface track 21, causes casing 13 to move to the right in dependence upon the displacement path representing the change in tilting angle of the swash plate as provided by the system.

Displacement of casing 13 by operation of the cam-feeler system stops when feeler roll 20 enters cam path 22 having circular contour over the angle range β so that now the regulator operates as zero-regulator or the particular flow and pressure have reached values corresponding to the desired constant power output.

During the hyperbolic displacement control of casing 13 to the right, piston 14 moves relative thereto to the left, so that at first channel 15, duct 8 and chamber C are disconnected from discharge outlet channel 17. Upon further displacement of piston 14 relative to casing 13, to the right therein, channels 15 and 16 are interconnected via bore 27. Thus, the changes in operating pressure in pipe 26 as effective in duct 9, are transmitted via channels 16–15, as interconnected by bore 27, ring channel 10, duct 8 to chamber C. Thus, after an initial discharge of chamber C, operating pressure of the fluid system becomes again effective in chamber C to act upon the relatively larger operating surface F2 of control piston 3. As control casing 13 and regulator piston 14, serving also as pressure sensing piston, are displaced the overall result thereof causes the fluid flow times the operating pressure to represent constant power output, due to pressure dependent oscillatory tilting movement of the swash plate.

Instabilities may occur due to pressure peaks and damming of flow. These instabilities are noticeable usually as oscillations, particularly in the range of zero piston stroke of the fluid pump pistons. In order to reduce these instabilities, choke 25 is provided as bypass for pressure oil pipe or duct 8 discharging residual fluid quantities to zero pressure outlet 17, thus, dumping hunting of the swash plate. As operating pressure has normalized, i.e., as the particular pressure level associated with maximum fluid flow has been restored, casing 13 and regulator piston 14 have resumed their previous relative position, closing off channel 15 as it leads to duct 8 and to chamber C to maintain particular position of piston 3.

As it can be seen, due to differing sizes of piston surfaces F1 and F2 tilting speed of the swash plate as controlled by piston 3 differs, depending upon the direction of piston motion and tilt. In other words, without further measures, control piston 3 will move faster in one direction than it can move in the opposite direction (at different times, of course). In order to control response time of the regulator system, regulator piston 14 is provided with differing throttling collars. A throttle collar 28, closer to spring 18, has smaller diameter, thus, defining a larger fluid passage than collar 29 with somewhat larger diameter. Accordingly, different quantities of fluid (oil) per unit time will flow into chambers B or C, so that the speeds of piston 3 in either direction are similar.

The invention is not limited to the embodiments described above but all changes and modifications thereof not constituting departures from the spirit and scope of the invention are intended to be included.

I claim:

1. Power control and regulation system for fluid pumps or motors of the axial piston, swash plate type operating at particular rotational speed, there being means for adjusting the tilting angle of the swash plate and there being conduit means under operating pressure for the pump or motor, the combination comprising:

first means defining a first piston chamber; a first piston in the first chamber linked to the adjusting means for controlling and adjusting the tilting angle of the swash plate, the first piston chamber connected so that one side of the first piston is under pressure of the conduit means;

a displaceably positioned control casing defining a second piston chamber; a second piston in the casing also connected to the conduit means, the connection including channel means leading through the casing, for the second piston to be acted upon by the pressure in the conduit means; spring means disposed for acting upon the second piston for providing position bias for the second piston independently from the position of the casing to obtain balanced position of the second piston in the casing, the position of the second piston being balanced in the casing in dependence upon the operating pressure in the conduit means; the second piston operating as valve, there being duct and channel means including channel means traversing the casing and connecting the second piston chamber in the casing to the first piston chamber on the other side of the first piston, the connection opened and closed in dependence upon the relative position of the second piston in the casing for control of flow of pressure fluid to the first chamber on the other side of the first piston thereby controlling the position of the first piston in the first piston chamber;

second means for supporting the casing for displacement thereof in direction of displacement of the second piston in the casing;

a turning lever having one arm linked to the adjusting means to obtain an angular position in dependence upon the position of the swash plate tilting angle; and a cam-feeler arrangement linking the lever with the casing to obtain displacement of the casing parallel to said direction of displacement of the second piston and relative to the second piston as spring biased, the displacement being dependent upon the turning angle of the lever.

2. Power control and regulation system as in claim 1, the cam-feeler arrangement including a first cam surface representing a hyperbolic curve to provide hyperbolic pressure-flow dependency of fluid in the conduit means upon engagement with the feeler for position control of the casing, there being a second cam surface continuing the first surface to obtain pressure limit operation.

3. Power control and regulation system as in claim 2, the second cam surface defined by a constant radius causing the casing to maintain particular position when engaged by the feeler.

4. Power control and regulation system as in claim 1, the second piston as operating as valve controlling inflow and outflow of control fluid of the first chamber, the second piston provided with throttling collars to obtain different flow cross-sections through the valve for inflow and outflow.

5. Power control and regulation systems as in claim 1, the first piston provided as differential piston, one side of the piston acted upon by the pressure in the conduit means, the opposite side being in communication with the valve to provide selective connection to the conduit means or to a discharge outlet, depending upon the relative position of the second piston in the casing.

6. Power control and regulation system as in claim 1, the casing being displaced by the cam feeler arrangement to obtain hyperbolic relation between pressure and flow in the conduit means.

References Cited

UNITED STATES PATENTS

| 2,931,176 | 4/1960 | Bloch et al. | 60—52 |
| 2,283,321 | 5/1942 | Doe et al. | 417—212 X |
| 3,407,738 | 10/1968 | Bosch | 417—218 |
| 2,969,021 | 1/1961 | Menon | 417—212 X |
| 3,232,238 | 2/1966 | Faisandier | 417—212 X |
| 2,606,423 | 8/1952 | Spencer | 60—53 |
| 3,302,585 | 2/1967 | Adams et al. | 417—222 |

WILLIAM L. FREEH, Primary Examiner

U.S. Cl. X.R.

91—506